Jan. 3, 1956  H. PETERS ET AL  2,729,148
MECHANISM FOR INSERTING A SLEEVE IN A BAG VALVE
Filed Aug. 14, 1950  10 Sheets-Sheet 8
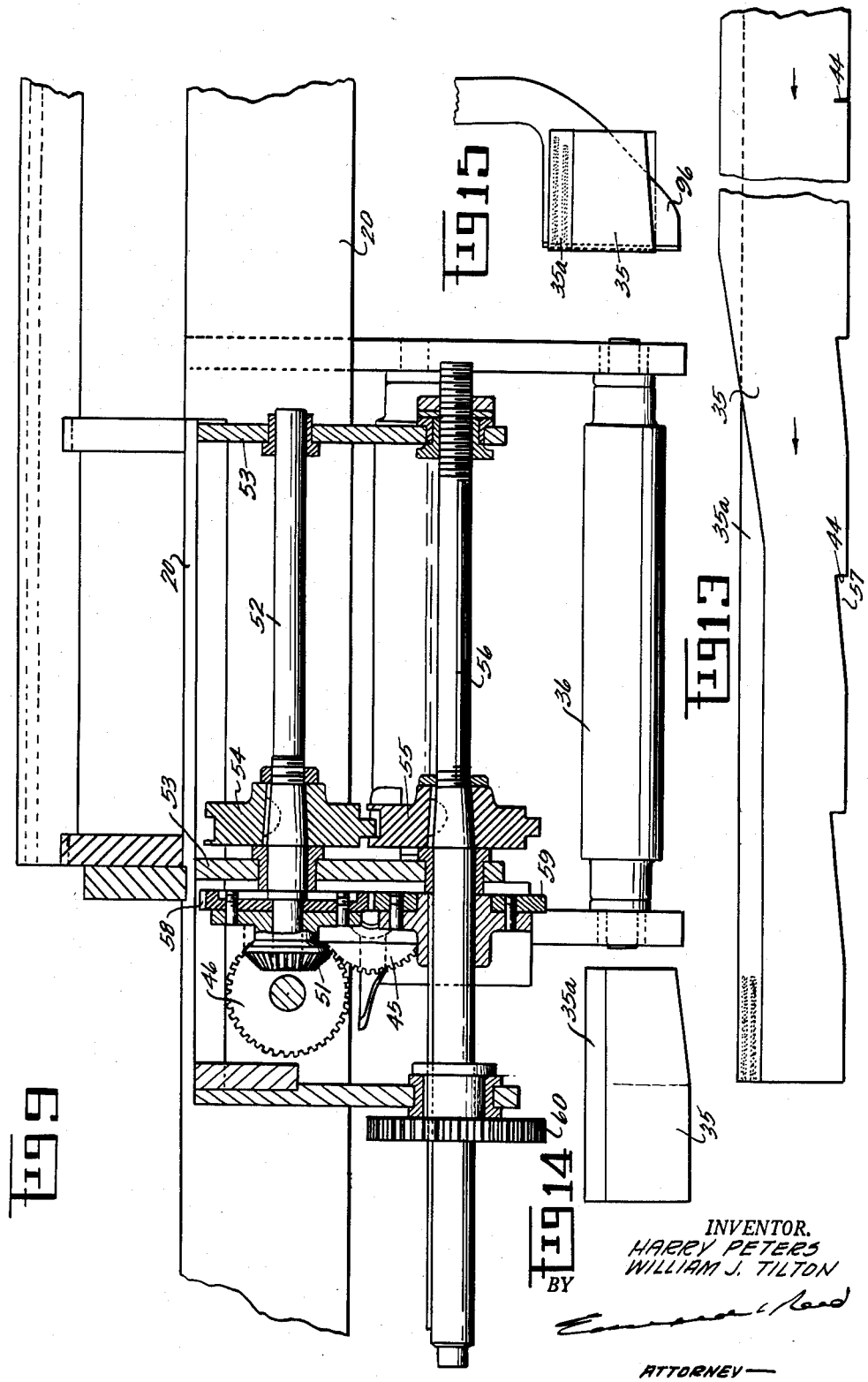
INVENTOR.
HARRY PETERS
WILLIAM J. TILTON
BY
ATTORNEY

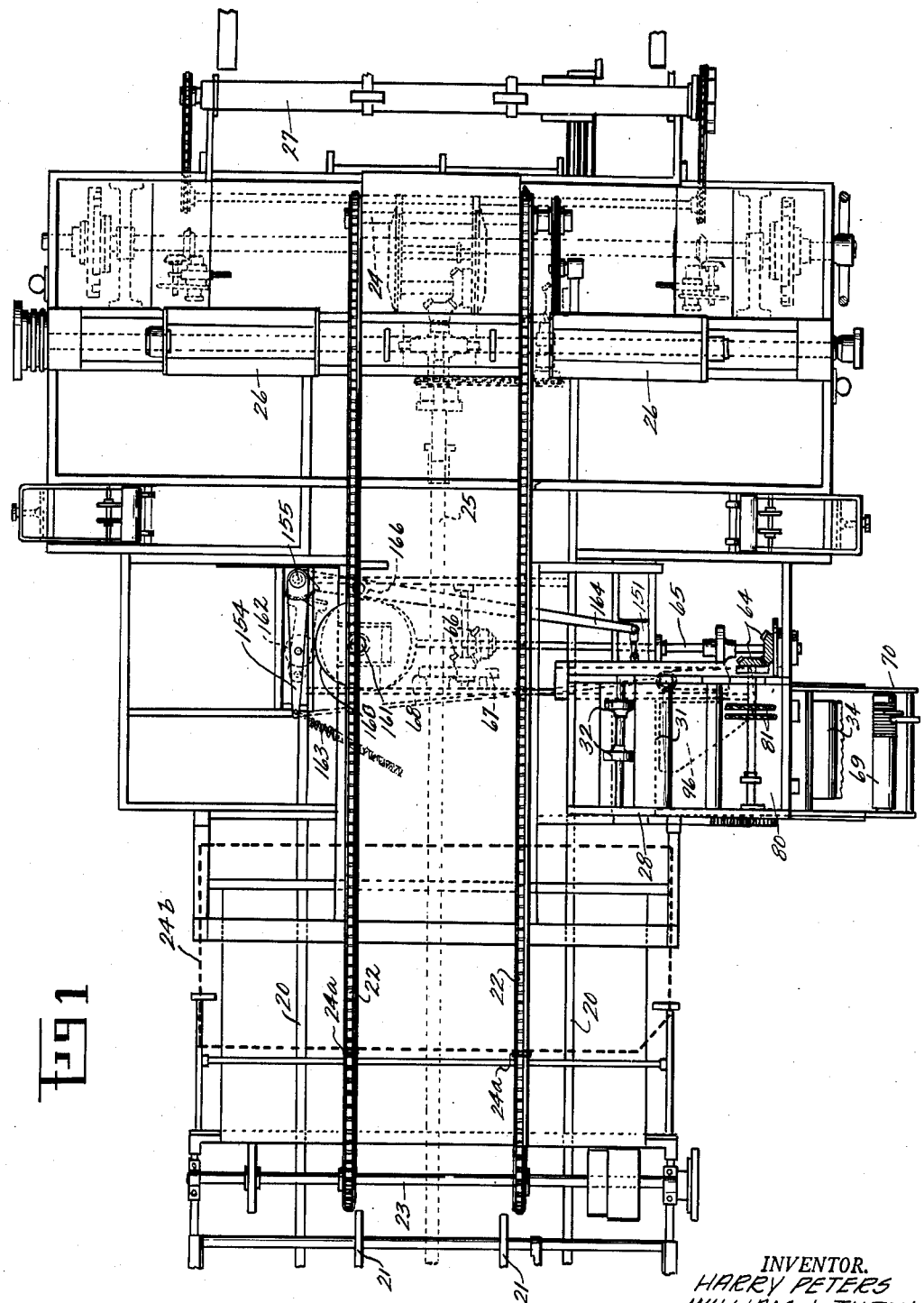

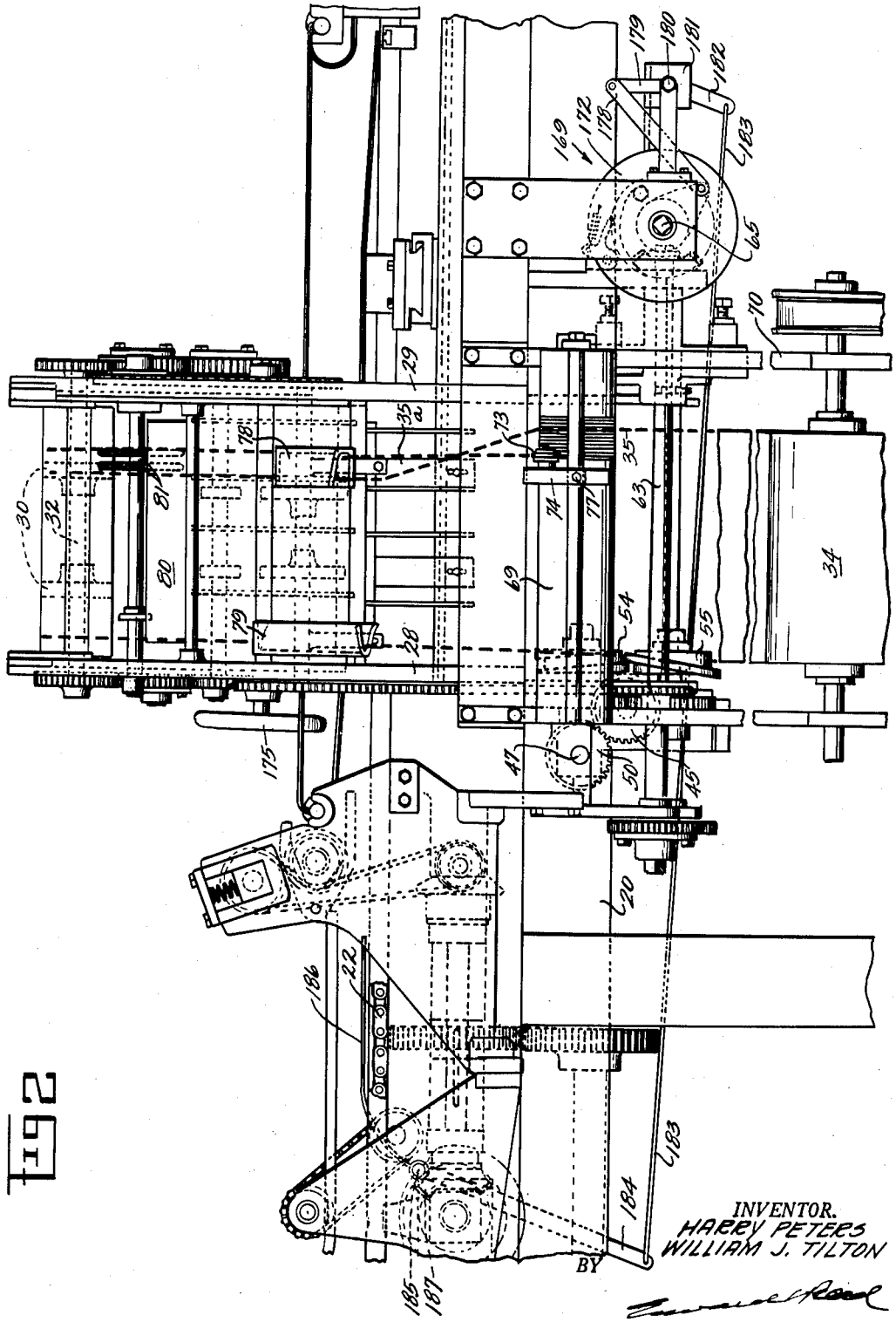

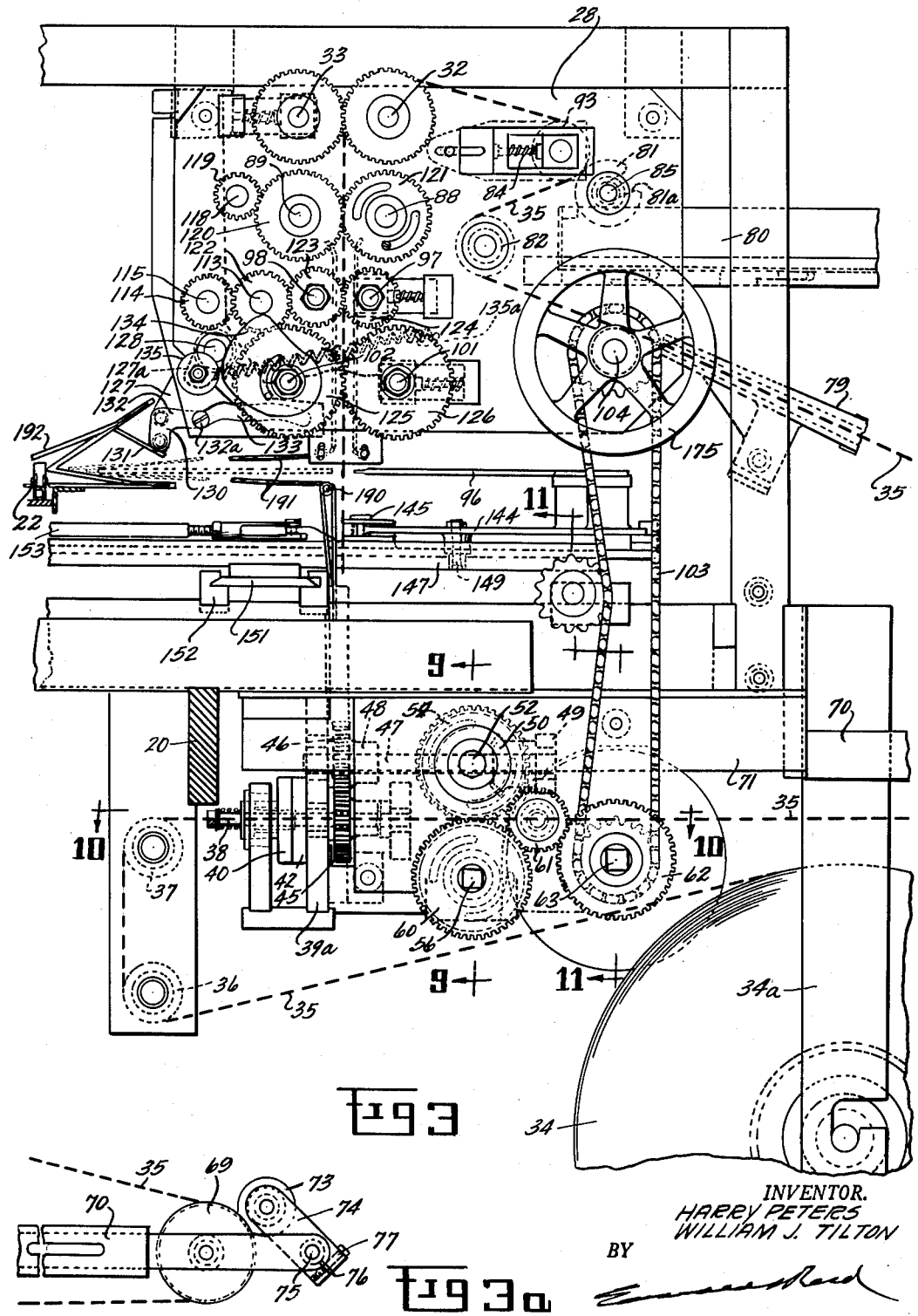

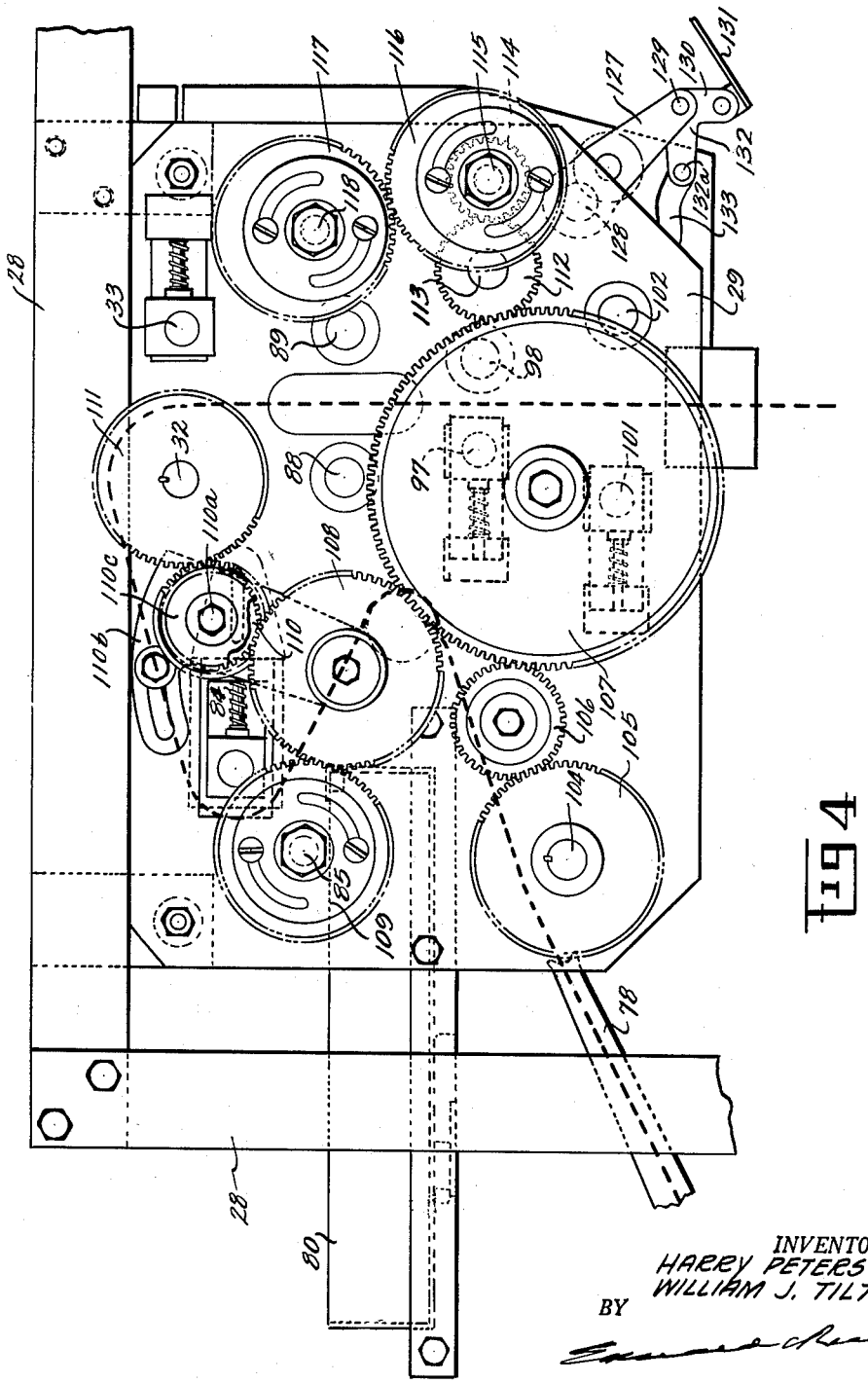

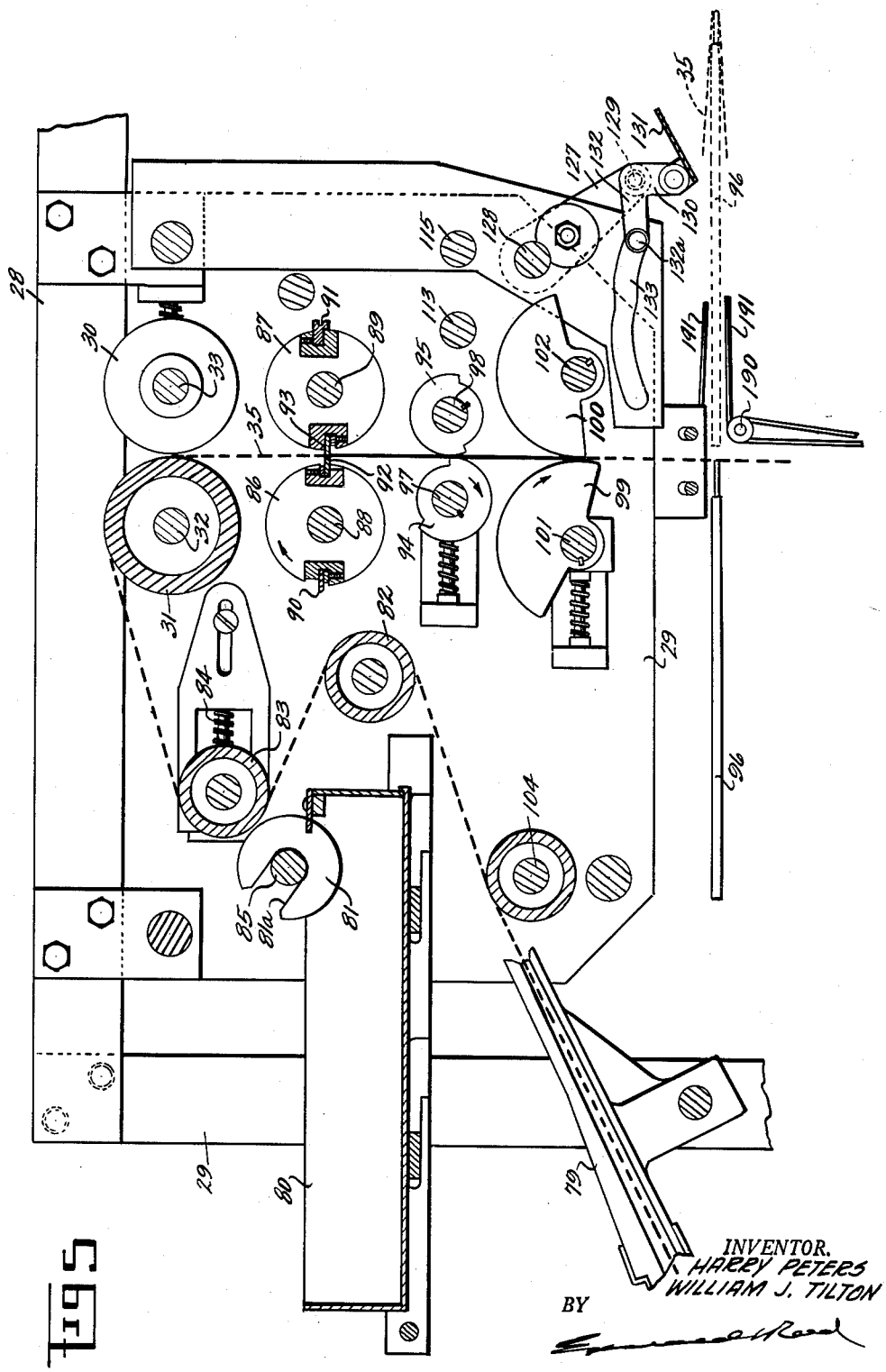

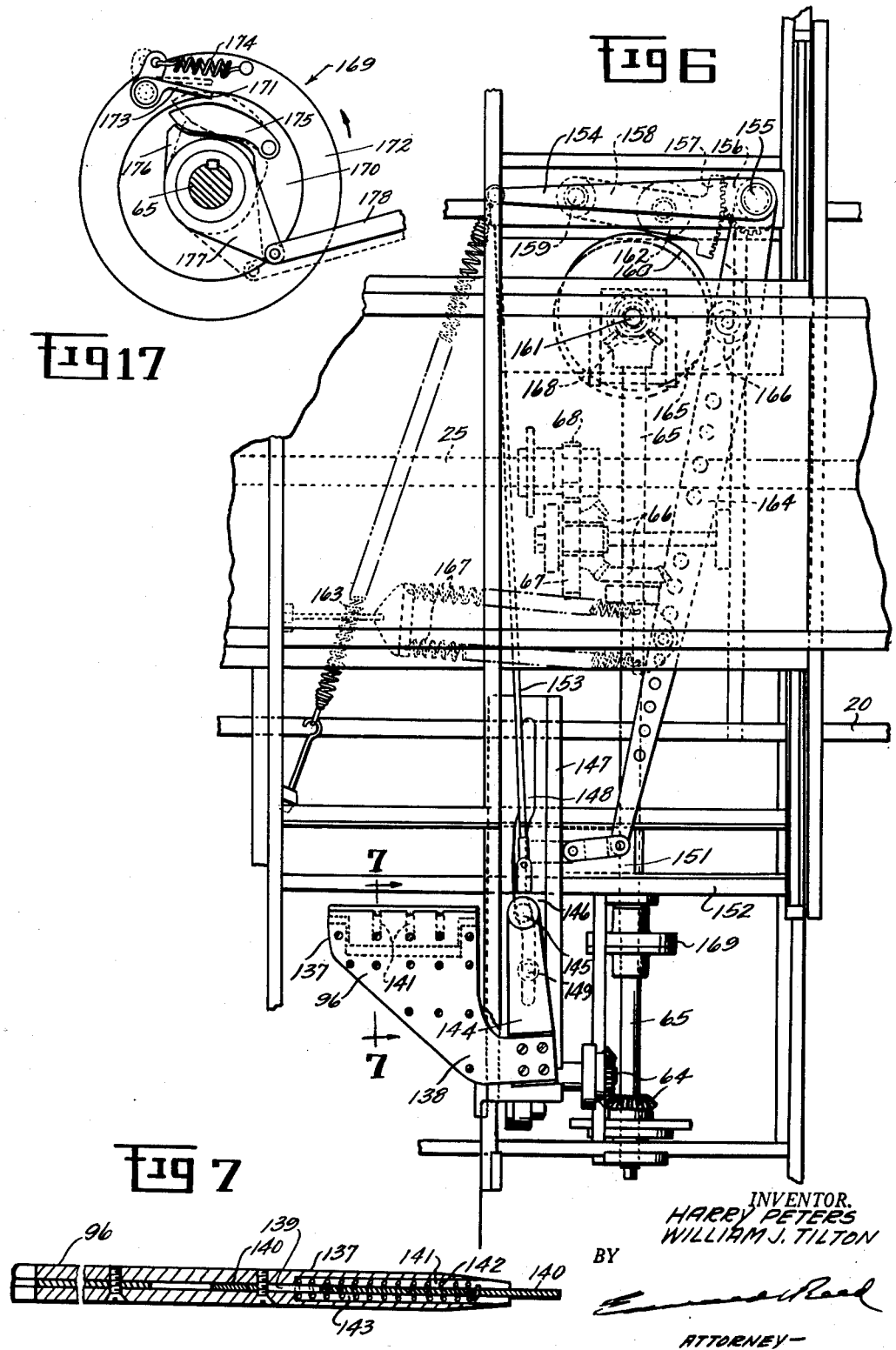

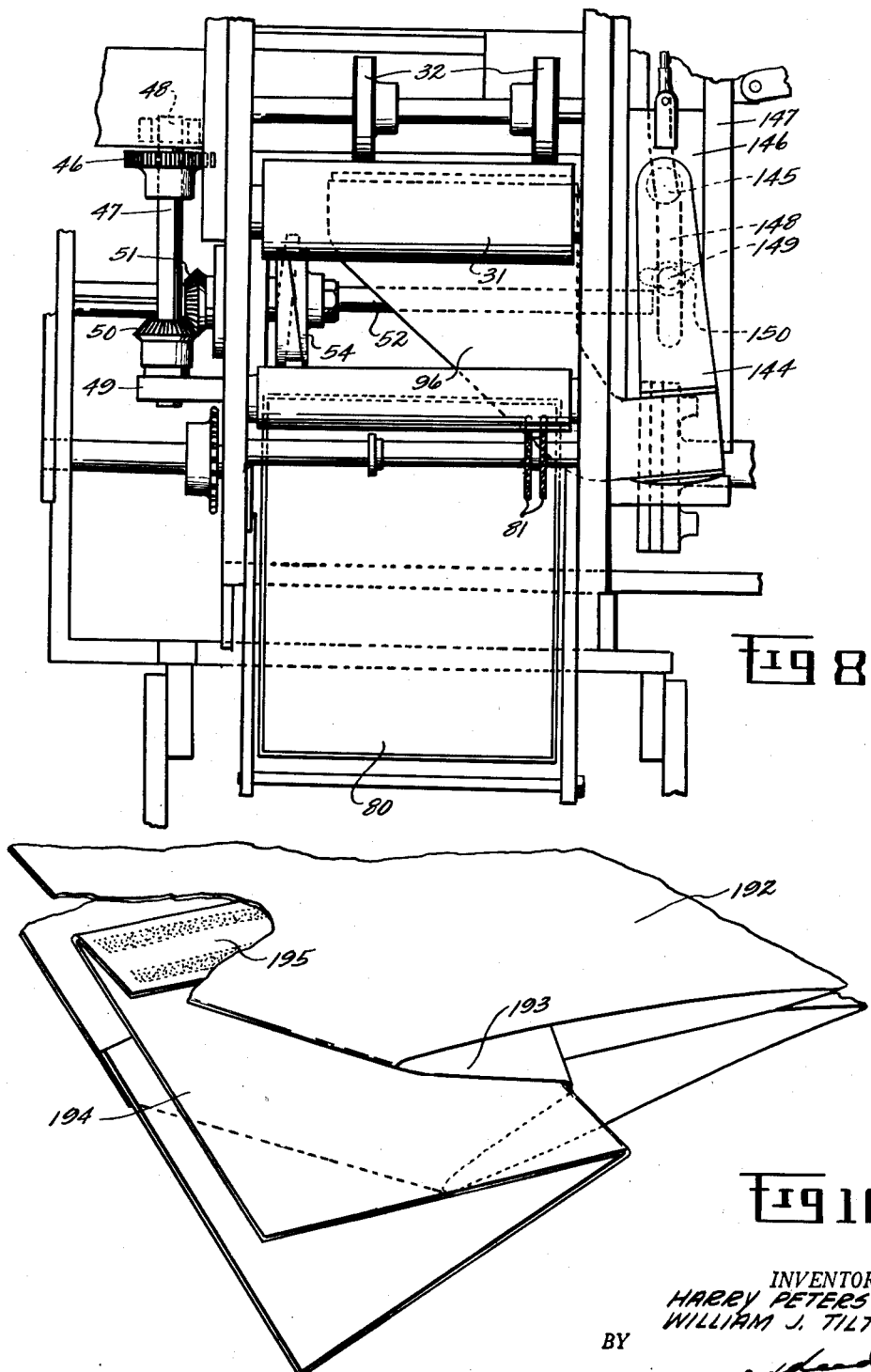

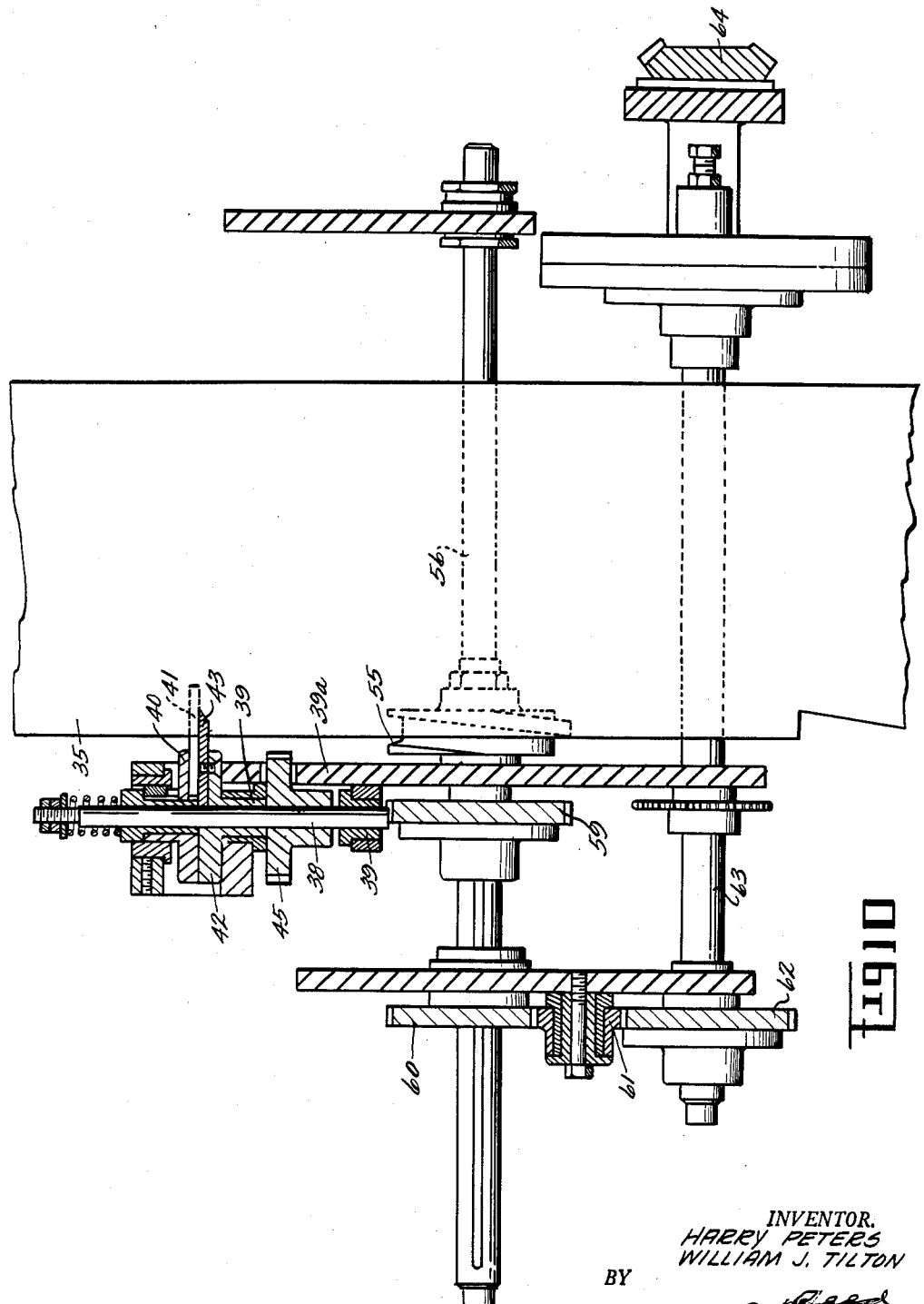

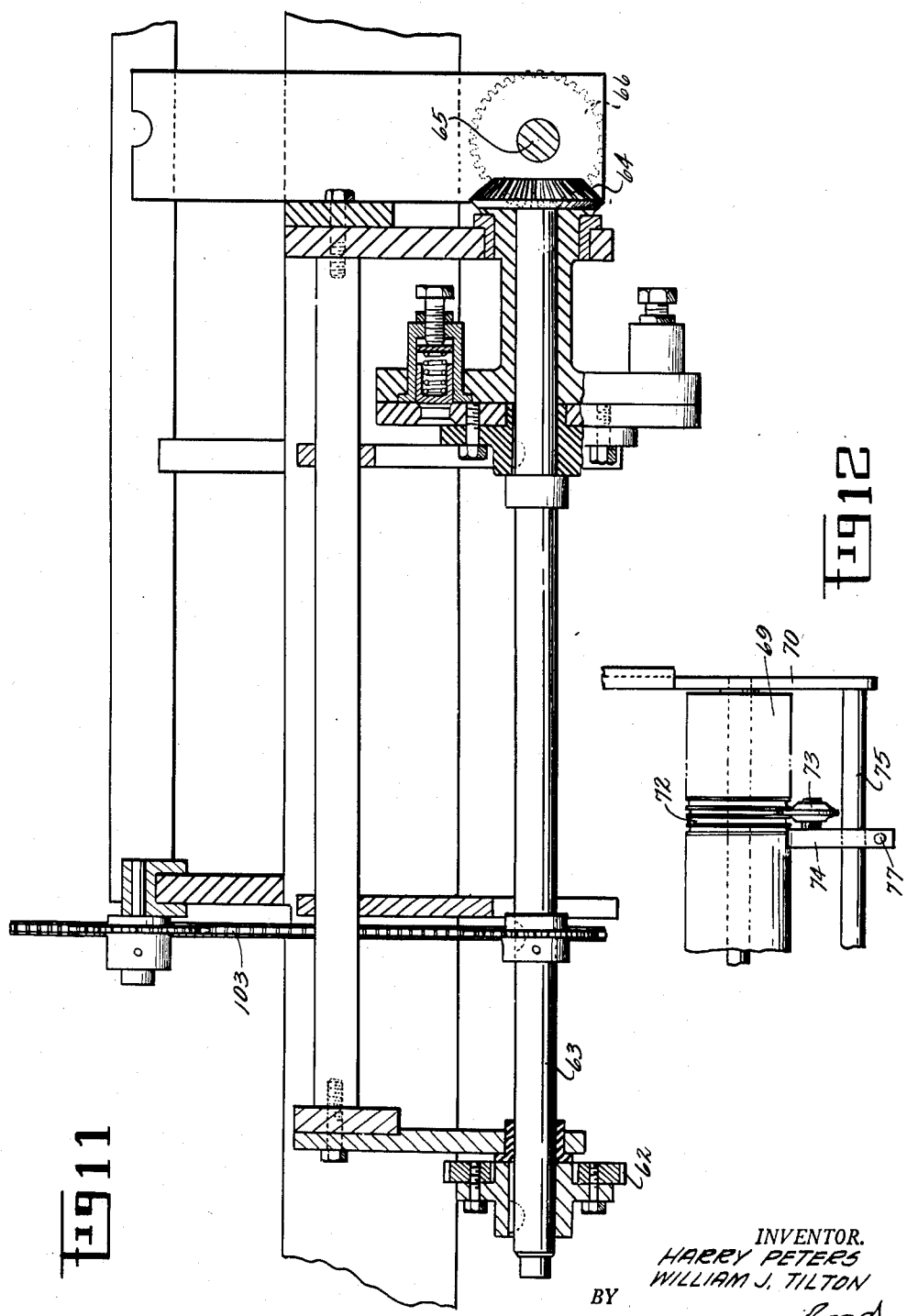

United States Patent Office 2,729,148
Patented Jan. 3, 1956

2,729,148

MECHANISM FOR INSERTING A SLEEVE IN A BAG VALVE

Harry Peters, Middletown, and William J. Tilton, Franklin, Ohio, assignors to The Raymond Bag Company, Middletown, Ohio, a corporation of Ohio Application August 14, 1950, Serial No. 179,142

9 Claims. (Cl. 93—8)

This invention relates to a mechanism for inserting a sleeve in the valve of a valved bag.

A valved bag comprises one or more tubes of paper cut to bag length. Usually there are two or more such tubes nested one within the other. After the tube, or tubes, have been cut to bag length they remain in a collapsed, or substantially flat, form until the bag is finished and filled. While the bag is in this form one corner thereof is folded inwardly between the side walls of the bag to form the valve. Thereafter, the bag is closed, usually by stitching the ends of the side walls of the bag one to the other. The line of stitching at the valve end of the bag extends through the edge portion of the valve but does not obstruct the passage through the valve. When the bag is filled the valve is extended and is pressed outwardly by the contents of the bag to press the same against the end wall of the bag and thus close the valve passage or opening. For many purposes such a closure is sufficient but the bag is formed of heavy paper and the folded-in portion of the paper which forms the valve is of such stiffness that the walls of the valve cannot be easily crushed against the end wall with sufficient tightness to completely seal the valve opening. In the manufacture of bags which are to contain very fine material, it has been customary to insert in the valve a liner, or sleeve, of flexible material, such as soft paper, one end of which extends beyond the valve, and can be folded or crushed upon itself or against the bag walls to tightly seal the valve opening and prevent the seepage of fine material through the valve. Two types of sleeve are used. One type, commonly known as the "inner" sleeve, is arranged wholly within the bag with its outer end secured to the inner end portion of the valve and its inner end extending inwardly beyond the valve. The second type, commonly known as an "outer," or "tuck-in," sleeve, has its inner end secured within the valve and its outer end projecting outwardly beyond the valve and the adjacent portion of the bag so that it can be folded upon itself and/or crushed into valve opening to tightly close the valve. Heretofore such sleeves have, for the most part, been inserted in the valve by hand after the valve had been folded, but recently a mechanism has been provided whereby an inner sleeve can be inserted in the valve of a bag as the bag moves from the valve forming mechanism to the sewing heads, as shown in the Peters and Pierson patent, No. 2,442,431, of June 1, 1948.

One object of the present invention is to provide a mechanism which will mechanically insert a tuck-in sleeve in the valve of a bag after the valve has been folded.

A further object of the invention is to provide a mechanism which will insert a tuck-in sleeve in the valve of a bag which is being conveyed from the valve forming mechanism to the sewing mechanism.

A further object of the invention is to provide a mechanism for scoring a section of the sleeve material to form a fold line, severing said section and moving the same to a position in which said fold line is in the path of an inserting element.

A further object of the invention is to provide a sleeve inserting mechanism having means for automatically separating the side walls of the bag of the valve to facilitate the insertion of the sleeve.

A further object of the invention is to provide a mechanism which will form a sleeve having at its inner end a folded-over end, or cuff, and which will insert that sleeve in the valve of the bag and adhere the cuff to the valve.

A further object of the invention is to provide a valve inserting mechanism with means for forming and inserting a sleeve in which the outer ends of the side walls are of different widths, to facilitate the opening of the sleeve to receive a filling spout.

Other objects of the invention may appear as the mechanism is described in detail.

In the accompanying drawings, Fig. 1 is a plan view of a portion of a valve forming and sewing machine equipped with the sleeve inserter; Fig. 2 is a side elevation of a portion of such a machine showing the sleeve inserter in elevation and partly broken away; Fig. 3 is a rear elevation of the sleeve forming and inserting mechanism, partly broken away; Fig. 3a is an end elevation of a scoring device which has been broken away in Fig. 3; Fig. 4 is a front elevation of the sleeve forming and inserting mechanism; Fig. 5 is a vertical sectional view taken through the sleeve forming and inserting mechanism; Fig. 6 is a plan view of the inserting element and its actuating mechanism; Fig. 7 is a sectional view taken through the inserting element of Fig. 6 on the line 7—7; Fig. 8 is a top plan view of the strip feeding mechanism, the inserting mechanism, and a part of the operating mechanism for the inserting element; Fig. 9 is a section taken on the line 9—9 of Fig. 3; Fig. 10 is a section taken on the line 10—10 of Fig. 3; Fig. 11 is a section taken on the line 11—11 of Fig. 3; Fig. 12 is a plan view of a portion of the scoring device of Fig. 3a; Fig. 13 is a lay-out, partly broken away, of that portion of the strip which is between the roll of sleeve material and the strip feeding rollers; Fig. 14 is a plan view of a severed section of the strip; Fig. 15 is a plan view showing the severed section folded onto the inserting element; Fig. 16 is a perspective view, partly broken away, of the valve corner of a bag with a sleeve inserted in the valve; and Fig. 17 is an elevation of a trip device for disconnecting the strip feeding mechanism from the driving shaft.

In these drawings we have illustrated one embodiment of the invention and have shown the same in connection with a machine for folding, or tucking, the valve in a tubular section of bag material and for sewing the ends of the bag section after the valve has been folded, but it is to be understood that the mechanism as a whole, as well as the several parts thereof, may take various forms and may be used in connection with bag manufacturing machines of various kinds without departing from the spirit of the invention.

The machine in connection with which the valve forming and inserting mechanism is here shown, comprises a valve tucking mechanism, a conveyor to receive from the tucking mechanism the bag sections in which the valves have been formed, hereinafter referred to as "bags," and carry the same to and past the sewing mechanism and discharge the completed bag. This machine comprises a main frame including longitudinal side members 20 on which the several mechanisms are mounted. In Fig. 1 there is shown the feeding out rollers 21 only of the valve tucking mechanism, that mechanism per se forming no part of the invention. The conveyor comprises parallel chains 22 extending lengthwise of the main frame, supported on sprocket wheels carried by a rear shaft 23 and by a front shaft 24, each provided with a series of lugs 24a to engage and advance the bags in narrowly spaced relation one to the other, one such bag being shown in broken lines at 24b. The front shaft is driven in a known manner from a power shaft 25 extending lengthwise of the main frame and connected with a suitable source of power, such as an electric motor. The sewing mechanism includes sewing heads 26 mounted adjacent the forward end of the main frame and also driven from the power shaft 25 in a known manner. In the present instance the machine is provided at its forward or discharge end with a mechanism which receives the sewed bags from the conveyor, accumulates the same in bunches, each containing a predetermined number of bags, and delivers the bunches successively onto a conveyor or table, a portion of that mechanism being shown at 27.

The sleeve forming and inserting mechanism is mounted on the main frame 20 approximately midway between the rear, or bag receiving, end of the conveyor and the front, or discharge, end of the conveyor. This mechanism comprises an upright supplemental frame including a rear frame member 28 and a front frame member 29. Supported on this frame are devices for withdrawing a continuous web or strip of sleeve material from a source of supply of such material, for dividing the strip into sections of a predetermined length, for imparting a predetermined shape to each section, for facilitating the folding of each section on a predetermined line, and for moving said sections successively into the path of a moving element which folds the sections into sleeve form and inserts the same in the valves of bags on the conveyor. In the illustrated mechanism, the withdrawing mechanism comprises a pair of feed rollers 30 and 31 mounted respectively on shafts 32 and 33, each shaft being supported at its respective ends on the frame members 28 and 29. Preferably the source of supply of sleeve material comprises a roll 34 of thin paper in the form of a strip 35 of a width slightly greater than the length of the folded sleeve which is to be formed therefrom, the roll being rotatably supported on bars 34a extending from the main frame. As the strip of material is withdrawn from the roll 34 the first operation thereon is to remove from one edge portion thereof longitudinally spaced pieces of the material for the purpose of reducing the width of one end of each sleeve section with relation to the width of the other end of that section, so that when folded on a transverse fold line to form the sleeve one end portion of the sleeve will project beyond the other end portion thereof so as to provide a finger piece which may be gripped by the operator to open the sleeve for the insertion of the filling spout. For this purpose the strip is carried from the roll inwardly toward the main frame, upwardly about a pair of guide rolls 36 and 37 and from the upper guide roll it is carried outwardly to a cutting device which forms in the edge thereof relatively short slits spaced one from the other distances corresponding to the length of the sleeve sections. In the particular form here illustrated (Fig. 10), this cutting device comprises a shaft 38 mounted in bearings 39 in a supporting structure 39a secured to the main frame. Mounted adjacent the inner end of the shaft is a non-rotatable disc-like member 40 having secured thereto a part 41 which extends radially therefrom below and close to the path of the strip 35 and constitutes a cutter bar. Rigidly secured to the shaft adjacent the member 40 is a second disc-like member 42 having a cutter 43 extending radially therefrom. The cutter 43 rotates clockwise, as viewed in Fig. 3, and during its downward movement engages the web 35 adjacent the cutter bar 41 and this forms a slit in the edge portion of the web, as indicated at 44 in Fig. 13.

The shaft 38 may be rotated in any suitable manner and, as here shown, a gear 45 is rigidly secured thereto and meshes with a gear 46 on a shaft 47 mounted in bearings 48 and 49 (Figs. 3 and 8), and having adjacent the bearing 49 a miter gear 50 which meshes with a miter gear 51 on a shaft 52 extending transversely to the path of the strip 35 and rotatably mounted on supporting members 53 which are rigidly secured to and extend downwardly from the adjacent main frame members 20.

Mounted on the shaft 52 is a spiral cutter 54 (Fig. 9), which cooperates with a spiral cutter 55 on a shaft 56 also mounted on the supporting members 53. As the strip of material 35 advances the slitted edge portion thereof moves between the spiral cutters and the latter sever from the edge thereof tapered pieces of material to form tapered recesses 57, the end wall of each recess being formed by edges of the respective slits 44. The longitudinal wall of each recess slopes outwardly to the edge of the strip at a point spaced from the deeper end of the recess a distance not greater than one-half the distance between adjacent slits. The shafts 52 and 56 are connected one with the other for rotation in unison by gears 58 and 59 and the shaft 56 has secured to one end portion thereof a gear 60. The gear 60 is driven through an intermediate gear 61 (Fig. 3), by a gear 62 mounted on a shaft 63. The shaft 63 may be driven from any suitable source of power and as here shown extends lengthwise of the main frame and is connected by miter gears 64 (Figs. 1 and 11), with a shaft 65 which extends transversely to the main frame and is connected by miter gears 66 with a spur gear 67 which meshes with a spur gear 68 on the power shaft 25.

After the strip 35 passes the spiral cutters it moves outwardly and upwardly about a roller 69 (Figs. 13 and 3a), which is rotatably mounted on arms 70 secured to and extending outwardly from a supplemental frame 71 which is secured to the adjacent side member of the main frame 20. The roller 69 is provided with a circumferential groove 72 (Fig. 12), and a scoring disc 73 engages the strip, in line with the groove 72, as it passes about the roller 69 to score the same on a line adjacent to but spaced from that edge of the strip opposite the recessed edge of the strip. Preferably the roller is provided with a plurality of circumferential grooves 72 (Fig. 12) and the scoring disc is adjustable lengthwise of the roller 69 to enable the score line to be formed in any of the plurality of grooves. As shown in Figs. 3a and 12, the scoring disc is rotatably mounted on the end of an arm 74 which is adjustably mounted on the shaft 75 carried by the arms 70. Preferably the lower end of the arm 74 is split, as shown at 76, and the two parts thereof are drawn together as by a screw 77 to clamp the arm rigidly to the shaft 75 in adjusted positions with relation thereto.

The scored strip moves upwardly and inwardly from the roll 69 to a folding device which folds the edge portion of the strip on the longitudinal score line formed by the scoring disc 73 and onto the body of the strip, as shown at 35a in Fig. 13. The folding device may be of any suitable character and as here shown it comprises a member 78 secured to the upright frame 28—29 in an inclined position and having an inwardly facing groove which is flared at its forward end to receive the edge of the strip and initiate the folding thereof, and is of small width at its upper end to complete the folding of the edge portion of the strip. Preferably a grooved guide 79 is supported on the supplemental frame and faces the grooved member 78 to receive the recessed edge of the strip 35 and prevent the lateral displacement of the strip.

Supported on the supplemental frame is a paste applying device comprising a receptacle 80 and a paste applying member, or disc, 81, which removes paste from the receptacle and applies it to the strip 35. The web passes from the folding device about a guide roller 82 and over a second roller 83 which is arranged adjacent the paste applying member 81, the roller 83 being biased toward the member 81 by a spring 84 to retain the web in contact with the paste applying element. Preferably there are two paste applying members 81 spaced a short distance one from the other and these members are arranged to engage the folded over edge portion of the strip 35 so as to apply the paste to the outer surface of the folded over edge portion of the strip, which constitutes the cuff of the folded sleeve. The paste applying members are shown in the form of discs rigidly secured to a shaft 85 and continuously rotated, as will be hereinafter explained. Preferably the two discs are provided with alined peripheral notches 81a to prevent the application of paste on those portions of the strip which are to be engaged by a severing device to divide the strip into sections.

The strip 35 passes from the paste applying device to the feed rollers 30 and 31 and moves downwardly from the feed rollers to a device which scores the strip transversely to its length and then severs the leading end portion of the strip from the body thereof. As here shown (Fig. 5), this device comprises two rollers, or drums, 86 and 87, mounted respectively on shafts 88 and 89 which are mounted on the supplemental frame. Rollers 86 and 87 are provided with cooperating scoring devices, the roller 86 being, in the present instance, provided with a scoring blade 90 adapted to engage the strip 35 and press a narrow portion thereof into a shallow recess in the scoring block 91 on the roller 87, the arrangement being such that the strip will be scored on a transverse line spaced a predetermined distance from the leading end of the strip, preferably a distance equal to one-half the length of the section which is to be severed from the strip. In the arrangement shown the rollers 86 and 87 also carry the strip severing devices, a cutter 92 being secured to the roller 86 and cooperating with a cutter bar 93 on the roller 87. The severing elements are arranged to sever the scored end portion of the strip on a transverse line spaced a predetermined distance to the rear of the score line. In the arrangement shown the scoring elements and cutting elements of each roller are arranged in intersecting diametric lines extending through the axis of the roller, so that the score line is spaced equal distances from the ends of the severed section. As above stated, the paste applying discs are notched to prevent the application of paste at the line of severance. The scoring elements are of such length that they do not extend across the folded edge portion, or cuff, of the strip, therefore they do not engage the paste on that edge portion. See Fig. 14.

Means are provided for maintaining the strip taut during the scoring and severing operations and for releasing the same substantially at the instant the web is severed. As here shown, this means comprises two cooperating elements, or segments, 94 and 95, mounted respectively on shafts 97 and 98. The surfaces of these segments are of such circumferential lengths and so arranged that they grip the end portion of the strip between them prior to the scoring operation and draw the strip taut and retain it in that condition until the forward end portion has been severed from the body of the strip and then release the strip at substantially the instant the forward end portion of the strip is severed. The leading end of the severed section is gripped by an advancing device which advances the severed section to a position in which the transverse score line thereon is substantially in the path of a sleeve inserting element, as shown at 96 in Fig. 5. Preferably this advancing device comprises substantially semi-circular segments 99 and 100 which are mounted respectively on shafts 101 and 102 and are so timed with relation to the severing device and the segments 94 and 95 that at the time the strip is severed the lower end of the adjacent section will be gripped, or be about to be gripped, by the advancing segments 99 and 100. The segments 97 and 98 release the section as soon as it has been severed and the segments 99 and 100 continue the downward movement of the severed section until the score line thereon is in the path of the inserting element and then release the same and the severed section is engaged by the inserting element substantially at the instant it is released by the advancing segments. The inserting element moves at a substantial speed and engages the severed portion of the strip at the score line thereof with sufficient force to cause the same to fold above and below the inserting element and thus fold the severed section into sleeve form, and the continued movement of the inserting element moves the folded sleeve into the valve. Ordinarily the action of the inserting element will fold the sleeve section without the use of auxiliary devices, but, if desired, rods 190 may be arranged above and below the path of the inserting element beyond the section to be folded to insure the proper folding of all sleeves. In the present instance, resilient fingers 191 are supported on the rods and extend forwardly therefrom above and below the inserting element.

The strip feeding and severing devices which are mounted on the supplemental frame, may be actuated in any suitable manner but preferably the shaft 63, which is driven from the power shaft, as above described, is connected by a sprocket chain 103 with one end of a shaft 104 rotatably mounted on the supplemental frame and having secured to the other end thereof a gear 105 which meshes with an idler gear 106 which in turn meshes with a relatively large gear 107. The large diameter gear 107 meshes with a gear 108 which in turn meshes with a gear 109 on the shaft 85 of the paste applying device. The gear 108 also meshes with a gear 110 mounted on the stud 110a carried by an arm 110b which is adjustable about the axis of the gear 108. Also mounted on the stud 110a is a gear 110c which meshes with a gear 111 on the shaft 32 of the feed roller 31. Gear 110 is drivingly connected with the gear 110c but is detachable therefrom and removable from the stud 110a, and is interchangeable with other gears of different diameters to enable the feed roller to be driven at different speeds. The large gear 107 also meshes with a gear 112 on a shaft 113. On the other end of the shaft 113 opposite gear 112 is a gear 122 which meshes with a gear 123 on segment shaft 98 (Fig. 3), and that gear meshes with gear 124 on segment shaft 97. The gear 122 also meshes with a gear 125 on segment shaft 101 and the gear 125 meshes with gear 126 on segment shaft 102. Gear 122 also meshes with a gear 114 on shaft 115. On the opposite end of shaft 115, Fig. 4, is an elliptical gear 116 which meshes with elliptical gear 117 on shaft 118. A pinion 119 on the other end of shaft 118, Fig. 3, meshes with a gear 120 on shaft 88 of the scoring and severing devices and this gear meshes with gear 121 on shaft 89. The shaft 104 is provided with a hand wheel 175 whereby the several parts of the feeding and forming mechanism may be manually operated for the purpose of threading in a new web and for properly timing the same.

Due to the resiliency of the paper the side walls of a bag which is in position to receive the sleeve are spaced slightly one from the other and the side walls of the valve are spaced apart slightly, but the spacing of the side walls of the valve may not always be sufficient to permit the sleeve to be properly inserted. To avoid the possibility that the inserting element will not properly enter the valve, we have provided automatic means for positively opening the valve, as the inserting element approaches the same, see Figs. 3 and 5. As there shown, this means comprises an arm 127 which is pivotally mounted at one end, between the frame members on a shaft 128. A bell crank 129 is pivotally mounted on the free end of the arm 127, and pivotally secured to the downwardly extending arm 130 of the bell crank is a finger, or plate, 131, which is adapted to enter the space between the side walls of the bag. The other, or inwardly extending, arm 132 of the bell crank is provided with a stud 132a which travels in a cam slot 133 in a fixed part of the frame. A cam 134, here shown as rigidly secured to the shaft 101, engages a roller 135 on a short arm 127a secured to the shaft 128 and moves the arm 127 against the action of a spring 135a. Thus the rotation of the cam 134 moves the arm 127 outwardly about its axis and carries the finger 131 into the space between the upper and lower side walls of the bag as the inserting element closely approaches the latter. The outward movement of the bell crank with the arm moves the stud 132a outwardly in the cam slot 133 and moves the bell crank about its pivotal axis in a direction to move the finger 131 upwardly and thereby cause it to engage and lift the upper side wall of the bag and at the same time move the upper side wall of the valve upwardly to open the latter. After the sleeve has been inserted in the bag and the inserting element withdrawn the arm 127 and the bell crank are returned to their initial positions.

The sleeve inserting element 96 may be of any suitable character and as here shown, see Figs. 6 and 7, comprises a plate having a relatively wide forward end portion 137 and a relatively narrow portion, or arm 138 which, in the present instance, is approximately parallel with the front edge of the forward portion 137. Preferably the forward portion of the inserting element is provided with a yieldable member to engage the sleeve section and, as here shown, the forward portion of the sleeve inserting element is provided with a relatively narrow slot 139 extending lengthwise of the forward edge thereof and extending rearwardly for a substantial distance. Slidably mounted in this slot is a relatively thin blade 140 the forward edge of which is yieldably retained in a position in which it projects forwardly beyond the body of the inserting element. In the arrangement shown, the blade is provided with spaced longitudinal slots 141 in each of which is mounted a coil spring 142, the slotted portion of the body of the inserting element being provided with channelled portions 143 to receive the springs. The rear ends of the springs bear against the rear ends of these channelled portions and the forward ends thereof engage the forward ends of the slots in the blade, thus yieldably retaining the blade in its extended position.

The present apparatus is designed for inserting the sleeve in the valve of a bag while the latter is being moved by the conveyor towards the sewing heads, without interrupting the movement of the bag. Therefore, the inserting element is mounted for movement in a circuitous, or endless, path a portion of which extends into the valve of a bag being advanced by the conveyor and extends for a short distance in the direction of the movement of the bag. Another portion of the path of the inserting element extends through the positions occupied by the severed sleeve section, as shown in Fig. 5. This circuitous movement may be imparted to the inserting element in any suitable manner, and as here shown (Figs. 6 and 8), the mechanism for imparting this movement to the inserting element is substantially the same as that shown and described in the patent, No. 2,442,431. Preferably it comprises an arm 144 to the outer end of which the arm of the sleeve inserting element is secured, and the other end of the arm is pivotally mounted at 145 on a plate 146 which is slidably mounted in a guide member 147 which is arranged below and extends transversely to the line of movement of the conveyor. The base of the guide member 147 is provided with a cam groove 148 and a stud 149, rigidly secured to the arm 144, extends through an arcuate slot 150 in the plate 146 and into the cam slot 148. The plate 146 is rigidly connected with a second plate 151 slidably mounted in a second guide member 152 which extends substantially parallel with the line of movement of the conveyor. The first mentioned plate 146 is connected by a rod 153 with one end of an arm 154 which is pivotally mounted at its other end on a vertical shaft, or stud, 155. Rotatably mounted on the shaft 155 is a toothed segment 156 which is rigidly connected with the arm 154 and meshes with a corresponding segment 157 rigid with the adjacent end of the second arm 158 which is pivotally mounted at that end opposite the segment on a fixed axis 159. The arm 158 is actuated by a cam 160 which is rigidly secured to a vertical shaft 161 and engages a roller 162 on the arm 158. The action of the cam 160 on the arm 158 causes the latter, through the toothed segments, to move the arm 154 about its axis against the action of a spring 163 and in a direction to move the plate 146 and the rear end of the inserting element in a direction transverse to the conveyor. The second plate 151, which is rigidly connected with the plate 146, is moved in a direction substantially parallel with the conveyor by an arm 164 which is connected at one end with the plate and has its other end pivotally mounted on the shaft 155. A cam 165 secured to the vertical shaft 161 engages a roller 166 on the arm 164 to move the same against the action of a spring 167 in a direction to move the second plate 151 lengthwise in the direction of the movement of the conveyor and to thereby move the first plate 146 transversely to its length in the direction of the movement of the conveyor. These two movements are imparted to the plates in timed relation and the movements so imparted to the plates, combined with the pivotal movement imparted to the arm 144 by the cam slot 148, moves the inserting element in the aforesaid circuitous path. Any suitable means may be provided for rotating the vertical cam shaft 161. In the present instance, the shaft is connected by miter gears 168 with the shaft 65 and, as above described, is driven by the power shaft 25.

It will be apparent from the foregoing description that the inserting element moves continuously in said circuitous path as long as the tucking and sewing mechanisms are in operation. The bags are advanced successively, in spaced relation, by the conveyor, which is divided by the lugs into a series of bag receiving sections. Means are provided for interrupting the operation of the strip feeding mechanism in the event any bag receiving section of the conveyor does not carry a bag as it approaches the inserting mechanism. This interrupting means is also substantially similar to the interrupting means shown in the above mentioned patent, and as here shown it is in the nature of a clutch 169 interposed between and connecting two parts of the shaft 65, which drives the strip feeding mechanism. The clutch includes a driving disc 170 rigidly secured to the inner part of the shaft 65 and having a peripheral recess forming a notch 171 in the edge of the disc, which thus constitutes a one tooth rachet. Mounted on the other part of the shaft, with which the miter gears 64 are connected, is a driven disc 172 of greater diameter than the driving disc 170 and which carries a pawl 173 and a spring 174 which retains the pawl normally in engagement with the shoulder 171 on the driving disc. The pawl extends laterally beyond the driving disc and a trip arm 175, which is pivotally mounted on the driving disc, extends beneath and adjacent to the laterally projecting edge of the pawl. Rotatably mounted on the shaft is a cam element 176 so arranged that when moved in a counterclockwise direction, as viewed in Fig. 17, it will move the trip element 175 upwardly against the pawl and disengage the latter from the driving disc. To impart this movement to the cam there is rigidly connected therewith a crank arm 177 which is connected by a link 178 with an arm 179 (Fig. 2) which is secured to a shaft 180 mounted on a bracket 181. Also secured to the shaft 180 is a second arm 182 which is connected by a rod 183 with a lever 184 pivotally mounted on the frame 185, and having connected therewith an arm 186 which normally extends forwardly between the conveyor chains 22. This arm is biased upwardly as by a spring 187 but is held normally in a substantial horizontal position by the weight of the bag moving over the same. If there is no bag on the section of the conveyor which is moving over the arm 186, that arm will be moved upwardly, and the lever mechanism will actuate the cam 176 in the direction to trip the pawl and disconnect the driven disc from the driving disc and thereby interrupt the operation of the feeding mechanism. The next bag on the conveyor will engage the arm 186 and move the same against the action of the spring to its horizontal position and thereby reestablish the driving connection between the discs 170 and 172.

In Fig. 16 there is shown the valve corner of a bag with the sleeve in the position which it occupies when the inserting element has been withdrawn, and prior to sewing. The corner portion of the bag is indicated at 192 and the valve 193 has been folded in and the sleeve 194 is seated in the V-shaped fold of the valve with its cuff portion 195 pasted to the inner surfaces of the side walls of the valve. The sleeve, of course, comprises a severed section of the strip of material 35 and the cuff is the folded-over edge portion 35a of the severed section of the strip.

While we have shown and described one embodiment of our invention, we wish it to be understood that we do not desire to be limited to the details thereof as various modifications may occur to a person skilled in the art.

Having now fully shown and described our invention, what we claim as new and desire to secure by Letters Patent, is:

1. In a mechanism for inserting a sleeve in a previously formed valve of a valved bag, means for supporting a bag with its valve in a position to receive a sleeve, a sleeve inserting element movable into and out of said valve, means for moving a section of sleeve material toward the path of said inserting element, means for folding one lateral edge portion of said section of material onto the body thereof, means for applying paste to the outer surface of said folded edge portion, means for scoring said section of material on a transverse line between the ends thereof, said moving means including means to advance said scored section to a position in which said score line is substantially in the path of said inserting element and to then release the same, and means for actuating said inserting element in timed relation to said advancing means to cause said inserting element to engage said section and fold the same on said score line with said folded edge portion thereof on the outer side of the folded section, and to move the folded section into said valve with said folded edge portion thereof in engagement with said valve and with the outer end portion thereof projecting outwardly beyond the outer end of said valve.

2. In a mechanism for inserting a sleeve in a previously formed valve of a valved bag, means for supporting a bag with its valve in a position to receive a sleeve, a sleeve inserting element movable into and out of said valve, means for withdrawing a continuous strip of sleeve material from a source of supply of said material and moving the same toward the path of said inserting element, means for folding one longitudinal edge portion of said strip onto the body thereof, means for applying paste to the outer surface of said folded over edge portion of said strip, means for scoring said strip on a transverse line spaced a predetermined distance from the leading end thereof, means for severing the end portion of said strip on a transverse line spaced a predetermined distance to the rear of said score line, means for advancing the severed end portion of said strip to a position in which said score line is substantially in the path of said inserting element and then releasing the same, and means for actuating said inserting element in timed relation to the movement of said advancing means to cause said inserting element to engage that surface of said severed end portion of said strip which is opposite said folded over edge thereof at substantially the time said severed end portion of said strip is released by said advancing means and to thereby fold said severed end portion of said strip on said score line to form a sleeve having said folded over edge portion on the outer side thereof and to move said sleeve into said valve with said folded over edge portion on the outer side thereof and to move said sleeve into said valve, with said folded over edge portion thereof adjacent the inner end of said valve and the other end portion thereof projecting outwardly beyond said valve.

3. In a mechanism for inserting a sleeve in a previously formed valve of a valved bag, means for supporting a bag with its valve in a position to receive a sleeve, a sleeve inserting element movable into and out of said valve, feed rollers to withdraw a strip of sleeve material from a source of supply of said material and move the same toward the path of said inserting element, means supported adjacent one edge of said strip of material in advance of said feed rollers for folding a relatively narrow edge portion of said strip onto the body thereof, means between said folding means and said feed rollers for applying paste to the outer surface of said folded over portion of said strip of material, rotatable elements arranged on the opposite sides of the path of said strip beyond said feed rollers having cooperating parts to score said strip on a transverse line spaced a substantial distance from the leading edge thereof, and having other cooperating parts to sever the end portion of said strip on a transverse line spaced a substantial distance to the rear of said score line, segments rotatably supported on opposite sides of the path of said strip having cooperating parts to maintain the same taut during the scoring and severing operations, a second pair of segments rotatably supported on opposite sides of the path of said strip and having surfaces to engage the severed portion of said strip and advance the same to a position in which said score line is substantially in the path of said inserting element and to then release said severed portion of said strip, and means for actuating said inserting element in timed relation to the movement of said last mentioned segments to cause said inserting element to engage that surface of said severed portion of said strip which is opposite the folded over edge portion thereof at substantially the time it is released by said last mentioned segments and to thereby fold said end portion of said strip on said score line to form a sleeve having a cuff at one end thereof and to move said sleeve into said valve with said cuff in engagement with the inner end portion of said valve and with the opposite end portion of said sleeve projecting outwardly beyond said valve.

4. In a mechanism for inserting a sleeve in a previously formed valve of a valved bag, means for supporting a valved bag with its valve in a position to receive the sleeve, a sleeve inserting element movable into and out of said valve, means for supporting a section of sleeve forming material in a position to be engaged by said inserting element as it moves toward said valve, means for actuating said inserting element to form the sleeve and to insert the sleeve in said valve, a lever pivotally mounted on a fixed support adjacent the valve end of a bag in the aforesaid position, a bell crank pivotally mounted on said lever, a member secured to one arm of said bell crank, a fixed plate having a cam slot therein, a stud carried by the other arm of said bell crank and movable in said cam slot, and a cam acting on said lever to move said member into the end of said bag and to cause said bell crank to be actuated by said cam slot to separate the side walls of said valve.

5. In a mechanism for inserting a sleeve in a previously formed valve in a valved bag, means for supporting a bag with its valve in a position to receive the sleeve, a sleeve inserting element movable into and out of said valve, means for moving a strip of sleeve material from a source of supply of such material toward the path of said inserting element, a cutting device supported at one edge of said strip to form in said edge portion relatively short slits spaced longitudinally one from the other, means for removing from said edge tapered portions extending from the respective slits not more than one-half of the distance from the adjacent slits to form recesses, a folding device arranged adjacent the other edge of said strip for folding a relatively narrow edge portion of said strip onto the body thereof, means for applying paste to said folded over edge portion, means for scoring said strip on a transverse line approximately midway between the deeper ends of the adjacent recesses, means for severing said strip into sections on transverse lines co-incident with the deeper end portions of the respective recesses, means for advancing said sections successively to positions in which the score lines thereupon are substantially in the path of said inserting element and releasing each section in said position, and means for actuating said inserting element to engage each section at said score line and thereby fold the end portions of said section one upon the other and to move the folded section into said valve.

6. In a mechanism for inserting a sleeve in a previously formed valve in a valved bag, means for supporting a bag with its valve in a position to receive the sleeve, a sleeve inserting element movable into and out of said valve, means for moving a strip of sleeve material from a source of supply of such material about a roller having a circumferential groove therein, a scoring device cooperating with said groove to score said strip on a longitudinal line spaced a relatively short distance from one edge thereof, a folding device supported adjacent the scored edge of said strip to fold the edge portion of said strip on said fold line, means for applying paste to the folded edge portion of said strip, means for scoring said strip on a transverse line spaced a predetermined distance from the leading end thereof, means for severing the end portion of said strip on a transverse line spaced a predetermined distance to the rear of said transverse score line, means for moving said severed end portion of said strip to a position in which said transverse score line is substantially in the path of said inserting element and then releasing the same, means for actuating said inserting element in timed relation to said advancing means to engage that surface of the severed portion of said strip opposite said folded over edge portion and to thereby fold said severed end portion of said strip to form a sleeve having a cuff at one end thereof and to insert said sleeve into said valve.

7. In a mechanism for inserting a sleeve in a previously formed valve of a bag, means for supporting a bag with its valve in a position to receive a sleeve, a sleeve inserting element movable into and out of said valve, means for withdrawing a continuous strip of sleeve material from a source of supply of said material and moving the same toward the path of said inserting element, means for folding one longitudinal edge portion of said strip onto the body thereof, means for severing said strip on a transverse line spaced from the leading end thereof, means for advancing the severed portion of said strip to a position in which an intermediate transverse portion thereof is in the path of said inserting element and then releasing the same, means for actuating said inserting element in timed relation to the movement of said advancing means to cause said inserting element to engage that surface of said severed end portion of said strip which is opposite said folded over edge thereof at substantially the time said severed end portion of said strip is released by said advancing means and thereby fold said severed end portion of said strip on a transverse line to form a sleeve having said folded over edge portion on the outer side thereof, and to move said sleeve into said valve with said folded over edge portion thereof adjacent the inner end of said valve and with the other end portion thereof projecting outwardly beyond said valve.

8. In a mechanism for inserting a sleeve in a previously formed valve in a valved bag, means for supporting a bag with its valve in a position to receive the sleeve, a sleeve inserting element movable into and out of said valve, means for withdrawing a continuous strip of sleeve material from a source of supply of said material toward the path of said inserting element, means supported at one side of the path of said strip for forming therein recesses spaced one from the other to reduce the width of portions of said strip, means for folding that edge portion of said strip which is opposite the recessed edge portion thereof over the body of said strip, means for severing the leading end portion of said strip at one end of the recess adjacent said end to form a sleeve section, means for moving the severed section to a position in which an intermediate transverse portion thereof is in the path of said inserting element and then releasing the same, and means for actuating said inserting element to fold the end portions of said strip one upon the other to form a sleeve and to move said sleeve into the valve.

9. The mechanism of claim 8 and including a cutting device supported at one edge of said strip to form in said edge portion relatively short slits spaced longitudinally one from the other, the said means for forming recesses serving to remove from said edge portion tapered portions extending fom the respective slits not more than one-half the distance between the adjacent slits whereby to form said recesses.

References Cited in the file of this patent

UNITED STATES PATENTS

| | | |
|---|---|---|
| 442,841 | West | Dec. 16, 1890 |
| 1,571,984 | Weber | Feb. 9, 1926 |
| 1,796,723 | Rife | Mar. 17, 1931 |
| 2,205,633 | Sharkey | June 25, 1940 |
| 2,215,518 | Weber et al. | Sept. 24, 1940 |
| 2,247,069 | Sargent et al. | June 24, 1941 |
| 2,387,274 | Lee | Oct. 23, 1945 |
| 2,437,693 | Hartman | Mar. 16, 1948 |
| 2,442,431 | Peters | June 1, 1948 |
| 2,483,860 | Vredenburg | Oct. 4, 1949 |
| 2,489,210 | Weeks | Nov. 22, 1949 |
| 2,559,873 | Grupe | July 10, 1951 |